United States Patent
Kishiyama

(10) Patent No.: US 10,034,303 B2
(45) Date of Patent: Jul. 24, 2018

(54) RADIO COMMUNICATION SYSTEM, BASE STATION, MOBILE STATION, AND RADIO COMMUNICATION METHOD

(75) Inventor: Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/117,551

(22) PCT Filed: Jun. 15, 2012

(86) PCT No.: PCT/JP2012/065419
§ 371 (c)(1),
(2), (4) Date: Nov. 13, 2013

(87) PCT Pub. No.: WO2012/173250
PCT Pub. Date: Dec. 20, 2012

(65) Prior Publication Data
US 2015/0119051 A1    Apr. 30, 2015

(30) Foreign Application Priority Data
Jun. 15, 2011 (JP) ................................ 2011-133065

(51) Int. Cl.
*H04W 74/04* (2009.01)
*H04W 72/04* (2009.01)
(Continued)

(52) U.S. Cl.
CPC ........... *H04W 74/04* (2013.01); *H04W 72/04* (2013.01); *H04W 74/006* (2013.01);
(Continued)

(58) Field of Classification Search
CPC . H04W 72/04; H04W 28/26; H04W 72/1268; H04W 28/04; H04W 28/20;
(Continued)

(56) References Cited

U.S. PATENT DOCUMENTS 8,094,616 B2 * 1/2012 Choi ..................... H04L 5/0016
370/329
8,284,867 B2 * 10/2012 Trachewsky ......... H04B 7/0613
370/328
(Continued)

FOREIGN PATENT DOCUMENTS

JP        2007-6080 A     1/2007
JP        2011041161 A    2/2011
(Continued)

OTHER PUBLICATIONS

International Search Report for corresponding International Application No. PCT/JP2012/065419, dated Aug. 28, 2012 (4 pages).
(Continued)

*Primary Examiner* — Christopher M Brandt
(74) *Attorney, Agent, or Firm* — Osha Liang LLP

(57) ABSTRACT

Provided are a radio communication system, a base station, a mobile station, and a radio communication method, by which it is possible to shorten a control time until the transmission of uplink data is possible, and to improve a perceived speed of a user when uplink data is small. A base station 100 transmits collision-type access permission including information on a collision-type access channel toward a plurality of mobile stations, the collision-type access channel serving as a radio resource other than a radio resource assigned in response to a scheduling request and a radio resource available for transmission of uplink data by the plurality of mobile stations. A mobile station 200A transmits the uplink data to the base station by using the collision-type access channel on the basis of the collision-type access permission received from the base station.

4 Claims, 7 Drawing Sheets

(51) Int. Cl.
*H04W 74/00* (2009.01)
*H04W 74/08* (2009.01)
*H04W 72/12* (2009.01)

(52) U.S. Cl.
CPC ...... *H04W 72/042* (2013.01); *H04W 72/1284* (2013.01); *H04W 74/08* (2013.01)

(58) Field of Classification Search
CPC . H04W 72/0453; H04W 28/24; H04W 28/18; H04W 48/12; H04W 74/00; H04W 72/042; H04W 84/12; H04W 72/1257; H04W 76/025; H04W 88/08
See application file for complete search history.

(56) References Cited

U.S. PATENT DOCUMENTS

| | | | |
|---|---|---|---|
| 2009/0147688 A1* | 6/2009 | Matsumoto | H04J 11/0056 370/242 |
| 2009/0325513 A1 | 12/2009 | Iwai et al. | |
| 2010/0284362 A1* | 11/2010 | Tajima et al. | 370/329 |
| 2011/0039568 A1 | 2/2011 | Zhang et al. | |
| 2011/0292895 A1* | 12/2011 | Wager | H04L 5/0007 370/329 |
| 2012/0188963 A1 | 7/2012 | Iwamura et al. | |
| 2012/0269149 A1 | 10/2012 | Okubo et al. | |

FOREIGN PATENT DOCUMENTS

| | | |
|---|---|---|
| WO | 2008/044629 A1 | 4/2008 |
| WO | 2010117311 A1 | 10/2010 |
| WO | 2011059060 A1 | 5/2011 |

OTHER PUBLICATIONS

3GPP TS 25.214 V10.2.0; "3rd Generation Partnership Project; Technical Specification Group Radio Access Network; Physical layer procedures (FDD) (Release 10);" Mar. 2011 (100 pages).
3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Mar. 2011 (197 pages).
Written Opinion for corresponding International Application No. PCT/JP2012/065419, dated Aug. 28, 2012 (4 pages).
Office Action issued in corresponding Japanese Application No. 2011-133065, dated May 11, 2015 (6 pages).
Decision of Refusal issued in the counterpart Japanese Patent Application No. 2011-133065, dated Feb. 9, 2016 (4 pages).
Office Action issued in the counterpart Japanese Patent Application No. 2016-093677, dated Mar. 14, 2017 (6 pages).
Ericsson, et al.; "Contention based uplink transmissions"; 3GPP TSG-RAN WG2 #66bis, R2-093812; Los Angeles, USA; Jun. 29-Jul. 3, 2009 (4 pages).

\* cited by examiner

FIG. 4
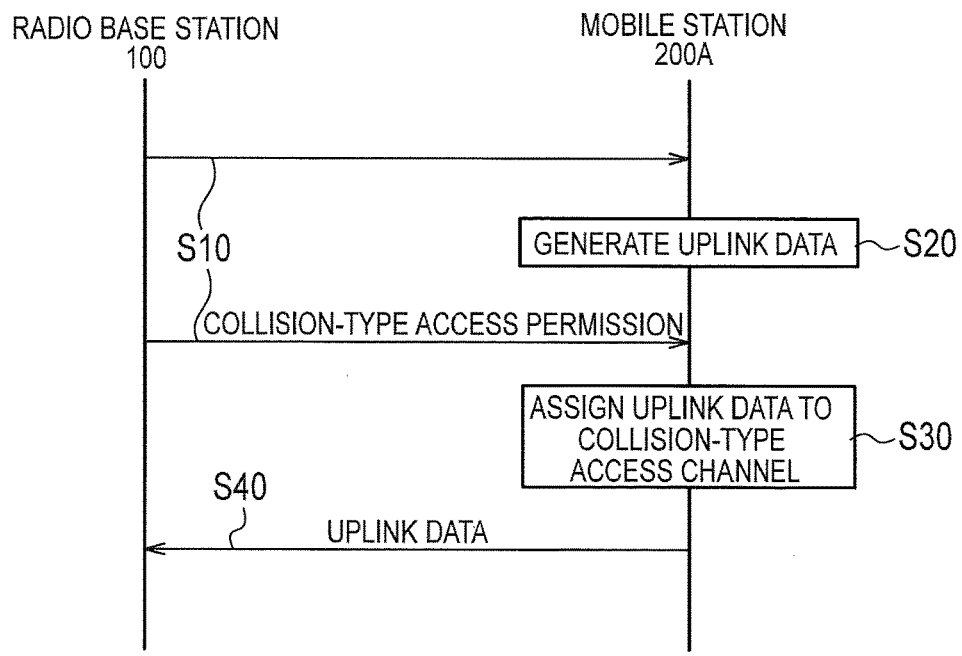
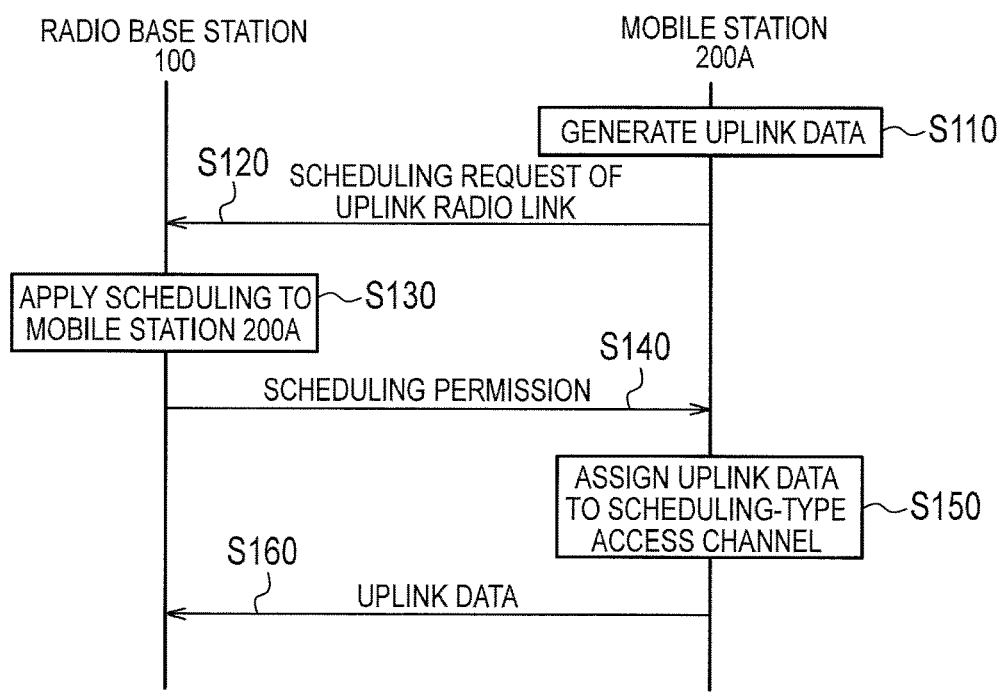

FIG. 6
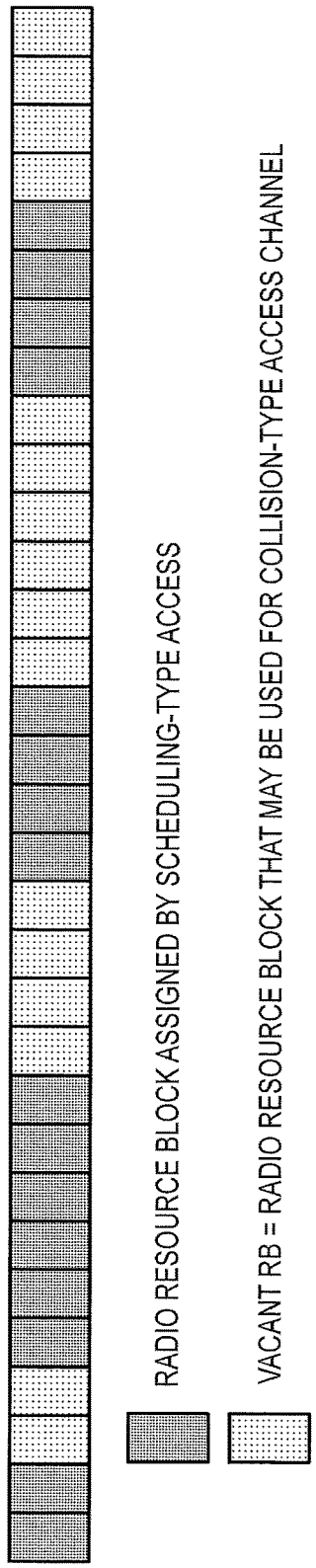

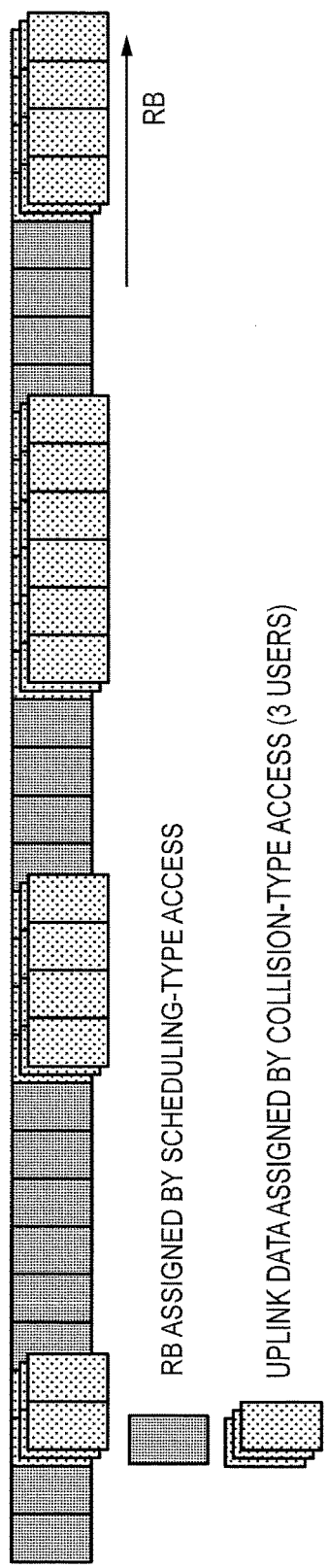

US 10,034,303 B2

RADIO COMMUNICATION SYSTEM, BASE STATION, MOBILE STATION, AND RADIO COMMUNICATION METHOD

TECHNICAL FIELD

The present invention relates to a radio communication system in which uplink data is transmitted on the basis of scheduling permission including the assignment of a radio resource, a base station, a mobile station, and a radio communication method.

BACKGROUND ART

In a radio communication system of Long Term Evolution (LTE) and the like that are standardized in 3rd Generation Partnership Project (3GPP), when a mobile station transmits uplink data, the mobile station is configured to transmit a scheduling request for requesting the assignment of a radio resource in an uplink radio link to a base station (for example, Non Patent Literature 1).

On the basis of the received scheduling request, a base station transmits scheduling permission including assignment information of the radio resource to the mobile station. On the basis of the received scheduling permission, the mobile station transmits uplink data by using an assigned radio resource, specifically, a schedule-type access channel (a shared data channel).

CITATION LIST

Non Patent Literature

[NPL 1] 3GPP TS 36.300 V10.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), March 2011

SUMMARY OF INVENTION

However, the aforementioned conventional uplink data transmission has the following problem. For example, when a user of a mobile station performs web browsing, if the time until the user presses a designated button and then a corresponding web page is displayed on a screen is short, a perceived speed, that is, a communication speed perceived by the user, may be fast.

Furthermore, when the amount of data required for display and the like of the web page is large, throughput of a downlink radio link may be dominant to the perceived speed. Meanwhile, when the amount of the data is small, then the time required for control until it becomes possible to transmit uplink data from a time point of pressing the designated button by the user may be dominant to the perceived speed.

Therefore, the present invention has been achieved in view of the above-described problems, and an object thereof is to provide a radio communication system, a base station, a mobile station, and a radio communication method, by which it is possible to shorten a control time until the transmission of uplink data is possible, and to improve a perceived speed of a user when uplink data is small.

A first characteristic of the present invention is summarized in that a radio communication system (a radio communication system 10), comprising: a mobile station (For example, a mobile station 200A) that transmits a scheduling request for requesting assignment of a radio resource in an uplink radio link; and a base station (a base station 100) that transmits scheduling permission including the assignment of the radio resource to the mobile station on the basis of the scheduling request received from one or a plurality of mobile stations, wherein the base station comprises: an access permission transmission unit (collision-type access permission transmission unit 130) that transmits collision-type access permission including information on a collision-type access channel toward a plurality of mobile stations, the collision-type access channel serving as a radio resource other than a radio resource assigned in response to a scheduling request and a radio resource available for transmission of uplink data by the plurality of mobile stations, and the mobile station comprises: an access permission reception unit (collision-type access permission reception unit 230) that receives the collision-type access permission from the base station; and a data transmission unit (collision-type access channel transmission unit 220) that transmits the uplink data to the base station by using the collision-type access channel on the basis of the received collision-type access permission.

A second characteristic of the present invention is summarized in that a base station, which receives a scheduling request for requesting assignment of a radio resource in an uplink radio link from one or a plurality of mobile stations and transmits scheduling permission including the assignment of the radio resource to the mobile station on the basis of the received scheduling request, comprising: an access permission transmission unit that transmits collision-type access permission including information on a collision-type access channel toward a plurality of mobile stations, the collision-type access channel serving as a radio resource other than a radio resource assigned in response to the scheduling request and a radio resource available for transmission of uplink data by the plurality of mobile stations.

A third characteristic of the present invention is summarized in that a mobile station, which transmits a scheduling request for requesting assignment of a radio resource in an uplink radio link toward a base station and receives scheduling permission transmitted on the basis of the scheduling request and including the assignment of the radio resource from the base station, comprising: an access permission reception unit that receives collision-type access permission including information on a collision-type access channel from the base station, the collision-type access channel serving as a radio resource other than a radio resource assigned in response to the scheduling request transmitted from one or a plurality of mobile stations and a radio resource available for transmission of uplink data by the plurality of mobile stations, and a data transmission unit that transmits the uplink data to the base station by using the collision-type access channel on the basis of the received collision-type access permission.

A fourth characteristic of the present invention is summarized in that a radio communication method which uses: a mobile station that transmits a scheduling request for requesting assignment of a radio resource in an uplink radio link; and a base station that transmits scheduling permission including the assignment of the radio resource to the mobile station on the basis of the scheduling request received from one or a plurality of mobile stations, wherein the radio communication method comprises: a step of transmitting, by the base station, collision-type access permission including information on a collision-type access channel toward a plurality of mobile stations, the collision-type access channel serving as a radio resource other than a radio resource assigned in response to the scheduling request and a radio resource available for transmission of uplink data by the plurality of mobile stations; a step of receiving, by the mobile station, the collision-type access permission from the base station; and a step of transmitting, by the mobile station, the uplink data to the base station by using the collision-type access channel on the basis of the received collision-type access permission.

BRIEF DESCRIPTION OF DRAWINGS

FIG. 4 is a diagram illustrating a transmission sequence of uplink data using a collision-type access channel and a transmission sequence of uplink data using a schedule-type access channel according to the embodiment of the present invention.

FIG. 6 is a diagram illustrating an example of a radio resource block (RB) available as the collision-type access channel according to the embodiment of the present invention, and an example of a format of collision-type access permission.

FIG. 7 is a diagram illustrating an assignment example of uplink data when RBs assigned as the collision-type access channel according to the embodiment of the present invention are discontinuous.

DESCRIPTION OF EMBODIMENTS

Figure 1:
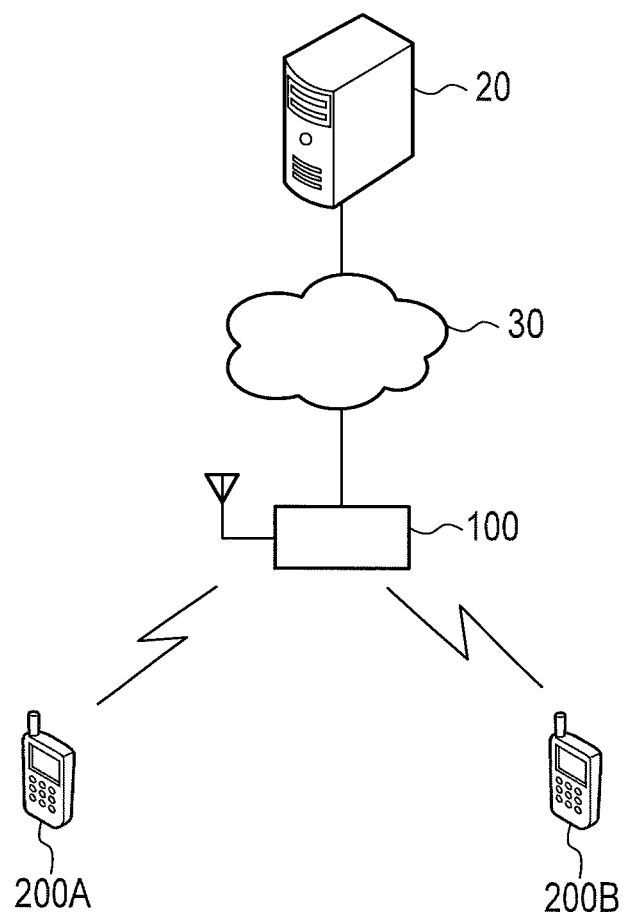
FIG. 1 is a diagram illustrating the entire schematic configuration of a radio communication system 10 according to an embodiment of the present invention.

Next, an embodiment of the present invention will be described. In the following description of the drawings, the same or similar reference numerals are used to designate the same or similar portions. It will be appreciated that the drawings are schematically shown and the ratio of each dimension, for example, are different from the real ones.

Therefore, a specific dimension, for example, should be determined in view of the following description. Of course, among the drawings, the dimensional relationship and the ratio may be different.

(1) Entire Schematic Configuration of Radio Communication System

FIG. 1 is a diagram illustrating the entire schematic configuration of a radio communication system 10 according to the present embodiment. As illustrated in FIG. 1, the radio communication system 10 includes a core network 30, a base station 100, and mobile stations 200A and 200B. Furthermore, a web server 20 is connected to the core network 30.

The base station 100 performs radio communication with the mobile stations 200A and 200B. Particularly, in the present embodiment, the base station 100 receives a scheduling request for requesting the assignment of a radio resource in an uplink radio link from one or a plurality of mobile stations. On the basis of the received scheduling request, the base station 100 transmits scheduling permission including the assignment of a radio resource to a mobile station which has transmitted the scheduling request to the base station 100.

The mobile stations 200A and 200B transmit the scheduling request for requesting the assignment of the radio resource in the uplink radio link to the base station 100. For example, when uplink data is generated in order to download a web page from the web server 20, the mobile station 200A transmits the scheduling request to the base station 100.

(2) Functional Block Configuration of Radio Communication System

Next, a functional block configuration of the radio communication system 10 will be described. Specifically, the functional block configurations of the base station 100 and the mobile station 200A will be described.

Figure 2:
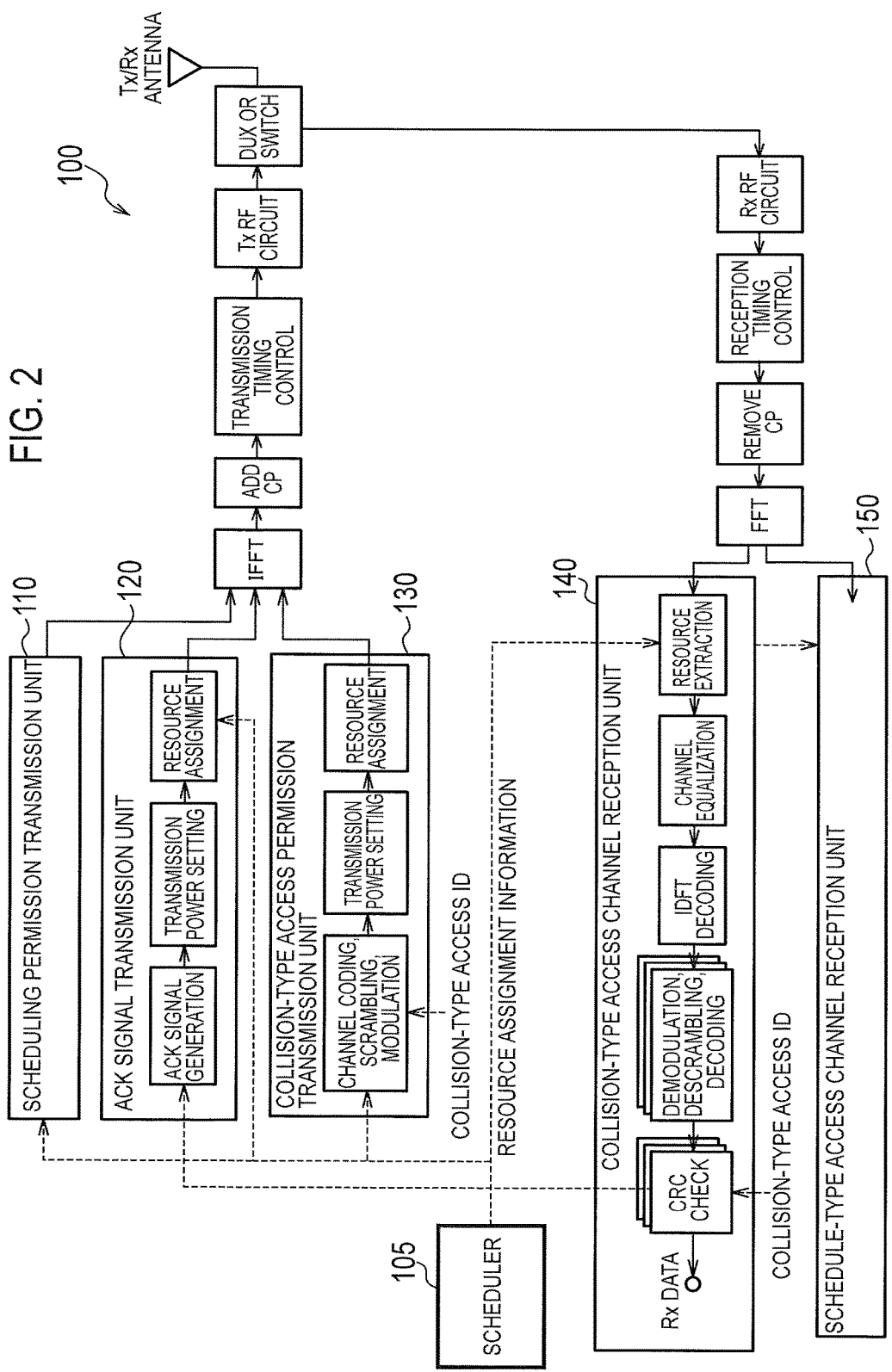
FIG. 2 is a functional block diagram of a base station 100 according to the embodiment of the present invention.
Figure 3:
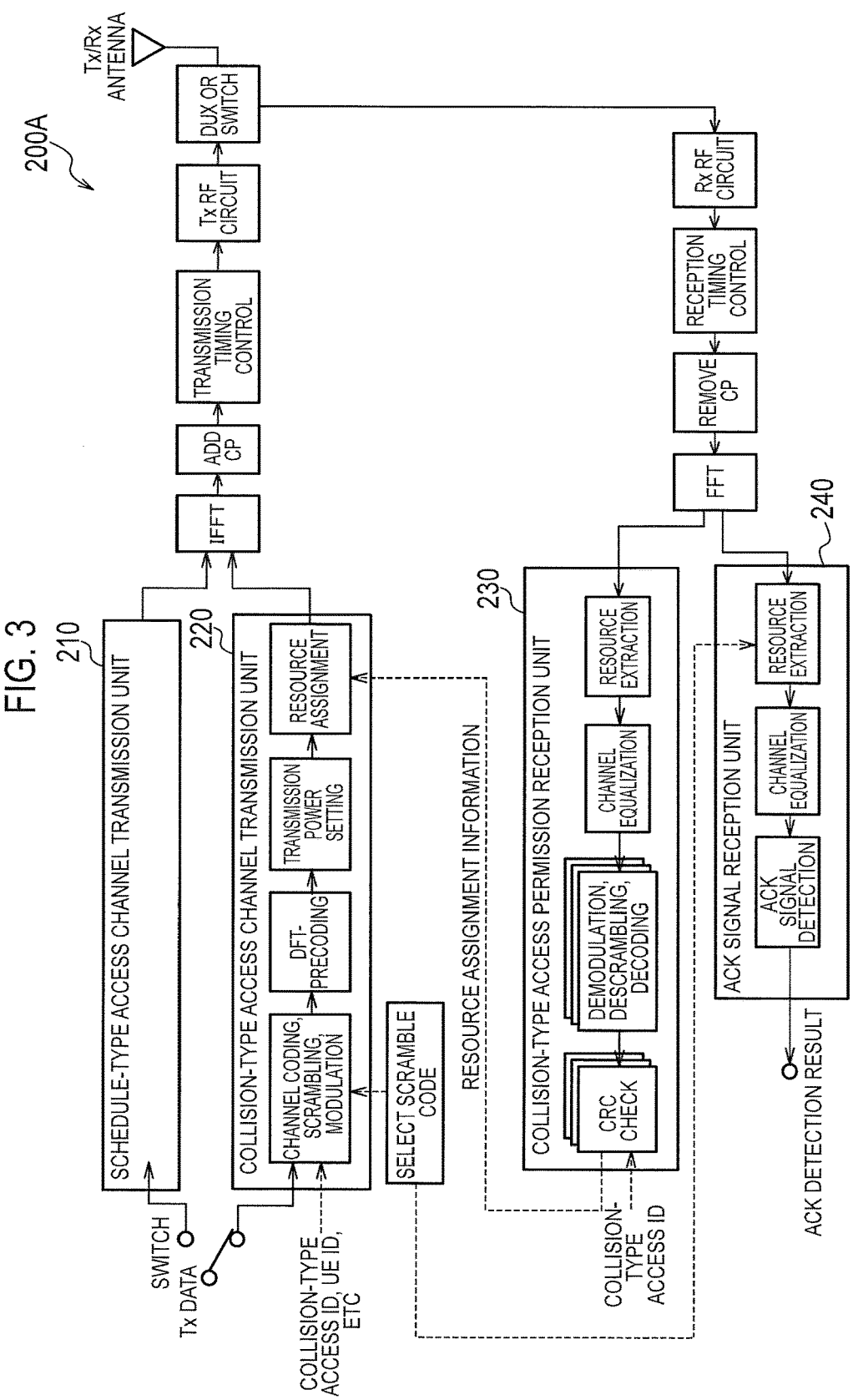
FIG. 3 is a functional block diagram of a mobile station 200A according to the embodiment of the present invention.

FIG. 2 is a functional block configuration diagram of the base station 100. FIG. 3 is a functional block configuration diagram of the mobile station 200A. In addition, hereinafter, parts, which have high association with the present invention, of the functional block configurations of the base station 100 and the mobile station 200A will be mainly described.

(2.1) Base Station 100

As illustrated in FIG. 2, the base station 100 includes a scheduler 105, a scheduling permission transmission unit 110, an ACK signal transmission unit 120, a collision-type access permission transmission unit 130, a collision-type access channel reception unit 140, and a schedule-type access channel reception unit 150.

The scheduler 105 controls the assignment of a radio resource block (hereinafter, RB) in the scheduling permission transmission unit 110, the ACK signal transmission unit 120, the collision-type access permission transmission unit 130, the collision-type access channel reception unit 140, and the schedule-type access channel reception unit 150.

The scheduling permission transmission unit 110 transmits scheduling permission (a scheduling grant) including the assignment of a radio resource in an uplink radio link to a mobile station that is a transmission source of a scheduling request. Specifically, the scheduling permission transmission unit 110 determines whether to transmit scheduling permission for the received scheduling request on the basis of an assignment situation of the RB.

Particularly, in the present embodiment, on the basis of a mobile station ID (UE ID) included in uplink data transmitted from the mobile station 200A (200B) by using a collision-type access channel, the scheduling permission transmission unit 110 is able to transmit scheduling permission toward a mobile station having the mobile station ID. That is, when the mobile station 200A (200B) which transmits the uplink data by using the collision-type access channel shifts to the transmission of uplink data using a schedule-type access channel, the scheduling permission transmission unit 110 transmits scheduling permission to a mobile station corresponding to the mobile station ID on the basis of control information on the mobile station ID, a payload size and the like.

The ACK signal transmission unit 120 transmits various types of ACK to the mobile station 200A (200B). Specifically, when the collision-type access channel reception unit 140 receives a collision-type access channel, the ACK signal transmission unit 120 returns ACK to a mobile station which has transmitted the collision-type access channel.

For the returning of the ACK, for example, Physical Hybrid ARQ Indicator Channel (PHICH) is available. Furthermore, when sets of a plurality of scramble codes are used for the transmission of the collision-type access channel, an index of a corresponding scramble code is also used for radio resource determination of the PHICH as well as an index of the RB.

Meanwhile, when the collision-type access channel reception unit 140 does not receive the collision-type access channel, the ACK signal transmission unit 120 may not return any ACK, or may return NACK by using a radio resource of a corresponding PHICH.

The collision-type access permission transmission unit 130 transmits, toward the mobile stations 200A and 200B, collision-type access permission (a collision-type access grant) for permitting the use of the collision-type access channel by the mobile stations 200A and 200B. The collision-type access channel is RB other than RB assigned to a schedule-type access channel in response to a scheduling request, and is a radio resource available for the transmission of uplink data by a plurality of mobile stations. The collision-type access permission includes information indicating RB of the collision-type access channel. In the present embodiment, the collision-type access permission transmission unit 130 constitutes an access permission transmission unit.

Furthermore, FIG. 6(a) and FIG. 6(b) illustrate an example of a radio resource block (RB) available as the collision-type access channel, and an example of a format of the collision-type access permission.

As illustrated in FIG. 6(a), the RB available as the collision-type access channel is vacant RB other than RB assigned to a schedule-type access channel for schedule-type access. In addition, when there is no RB assigned to the schedule-type access channel, all RBs may be assigned to the collision-type access channel.

The scheduler 105 and the collision-type access permission transmission unit 130 notify RB, which may be assigned to the collision-type access channel, by dynamically using a downlink control channel (collision-type access permission). The collision-type access permission is transmitted using RB that is common between users (mobile stations) attempting the use of the collision-type access channel. When it is applied to Long Term Evolution (LTE), such RB corresponds to a common search space.

As illustrated in FIG. 6(b), the collision-type access permission includes assignment information of RB for the collision-type access channel, a collision-type access ID for identifying collision-type access permission, and other control information. In addition, the assignment information of the RB for the collision-type access channel and the access ID are essential, but the other control information may not be necessarily included therein.

The collision-type access ID is configured by a data sequence that is also used for error detection (CRC check). Furthermore, the other control information may include the following information.

Signal format of collision-type access channel
Set of spreading code
Condition for allowing the transmission of collision-type access channel As the condition for allowing the transmission of the collision-type access channel, a parameter for suppressing a collision probability of uplink data transmission among a plurality of mobile stations may be considered. For example, a method for performing control for allowing only some mobile stations (users) to transmit the collision-type access channel includes designation of the range of the received quality (for example, SIR) of a radio signal of a mobile station capable of transmitting the collision-type access channel, and designation of the range of a mobile station ID (UE ID). Alternatively, a mobile station may autonomously and randomly determine the probability in which it is possible to transmit the collision-type access channel.

As described above, the collision-type access permission transmission unit 130 transmits, toward the mobile stations 200A and 200B, collision-type access permission including RB other than RB assigned in response to the scheduling request and the collision-type access ID for identifying the collision-type access permission.

Furthermore, the collision-type access channel includes the aforementioned collision-type access ID and mobile station ID (UE ID) in addition to uplink data (a payload). The collision-type access channel includes the mobile station ID, so that it is possible for the base station 100 to identify a mobile station which has transmitted the collision-type access channel.

The collision-type access channel reception unit 140 receives the collision-type access channel transmitted from the mobile station 200A (200B), and decodes uplink data transmitted from the mobile station by using the collision-type access channel. It is noted that there may be a case in which an assignment pattern of uplink data, such as a scramble code or an interleave pattern used when the mobile station 200A (200B) transmits uplink data through the collision-type access channel, is not recognized, the collision-type access channel reception unit 140 can attempt to decode all scramble codes (or interleave patterns) as will be described later.

The schedule-type access channel reception unit 150 receives the schedule-type access channel transmitted from the mobile station 200A (200B), and decodes uplink data transmitted from the mobile station by using the schedule-type access channel.

(2.2) Mobile Station 200A

As illustrated in FIG. 3, the mobile station 200A includes a schedule-type access channel transmission unit 210, a collision-type access channel transmission unit 220, a collision-type access permission reception unit 230, and an ACK signal reception unit 240. In addition, the mobile station 200B also has the same functional block configuration as that of the mobile station 200A.

The schedule-type access channel transmission unit 210 performs channel coding, scrambling, and modulation, for example, of uplink data, and transmits a schedule-type access channel including the uplink data.

The collision-type access channel transmission unit 220 performs channel coding, scrambling, and modulation, for example, of uplink data similarly to the schedule-type access channel transmission unit 210, and transmits a collision-type access channel including the uplink data. Specifically, the collision-type access channel transmission unit 220 transmits the uplink data to the base station 100 by using information on a collision-type access channel included in collision-type access permission received from the base station 100. In the present embodiment, the collision-type access channel transmission unit 220 constitutes a data transmission unit.

Furthermore, as described above, the uplink data transmitted from the mobile station 200A by using the collision-type access channel includes a mobile station ID for identifying the mobile station. The schedule-type access channel transmission unit 210 and the collision-type access channel transmission unit 220 is able to be switched as illustrated in FIG. 3, and when there is data to be transmitted using the collision-type access channel, the mobile station 200A transmits the collision-type access channel by using the whole or a part of RB designated by collision-type access permission.

In response to one assignment pattern randomly selected by a predetermined method from among a plurality of assignment patterns to the collision-type access channel of uplink data, the collision-type access channel transmission unit 220 is able to assign the uplink data to the collision-type access channel.

Specifically, even when a plurality of mobile stations (users) transmit the collision-type access channel at the same time, since the base station 100 enables decoding of uplink data transmitted from the plurality of mobile stations, the collision-type access channel transmission unit 220 randomly selects one from among a plurality of scramble codes (for example, 16) prepared in advance. The collision-type access channel transmission unit 220 applies the selected scramble code to the collision-type access channel. In addition, the collision-type access channel transmission unit 220 may select an interleave pattern of data and a mapping pattern of a resource element, for example, instead of the scramble code. Furthermore, the selection method includes a method using a random number and a method in which a designated assignment pattern is equal to or more than a fixed probability, for example.

Furthermore, when the RBs (refer to FIG. 6(*a*)) assigned as the collision-type access channel are discontinuous in at least one of a frequency domain and a time domain, the collision-type access channel transmission unit 220 may transmit uplink data according to an orthogonal frequency division multiplexing (OFDM) scheme.

FIG. 7 illustrates an assignment example of uplink data when the RBs assigned as the collision-type access channel are discontinuous. When the RBs assigned as the collision-type access channel are discontinuous as illustrated in FIG. 7, the collision-type access channel transmission unit 220 is able to transmit uplink data according to normal OFMD or Clustered DFT-spread OFDM. In addition, DFT-precoding included in the collision-type access channel transmission unit 220 of FIG. 3 is not necessary when the normal OFMD is used.

The collision-type access permission reception unit 230 receives collision-type access permission from the base station 100. In the present embodiment, the collision-type access permission reception unit 230 constitutes an access permission reception unit. The collision-type access permission reception unit 230 decodes information indicating RB assigned as a collision-type access channel included in the received collision-type access permission, and provides the information to the collision-type access channel transmission unit 220.

The ACK signal reception unit 240 receives various types of ACK from the base station 100. Particularly, in the present embodiment, the ACK signal reception unit 240 receives ACK, which indicates the reception of the collision-type access channel, by using the PHICH. Furthermore, as described above, when sets of a plurality of scramble codes are used for the transmission of the collision-type access channel, since an index of a corresponding scramble code is also used for radio resource determination of the PHICH as well as an index of RB, the ACK signal reception unit 240 receives ACK on the basis of the information and decodes a detection result of the ACK.

(3) Operation of Radio Communication System

Next, an operation of the radio communication system 10 will be described. Specifically, a transmission operation of uplink data using the collision-type access channel will be described.

FIG. 4(*a*) illustrates a transmission sequence of uplink data using the collision-type access channel. FIG. 4(*b*) illustrates a transmission sequence of uplink data using the schedule-type access channel.

As illustrated in FIG. 4(*a*), the base station 100 transmits, toward the mobile stations 200A and 200B, collision-type access permission (a collision-type access grant) for permitting the use of the collision-type access channel (S10). In addition, the collision-type access permission is repeatedly transmitted in a predetermined cycle.

As described above, in the state in which the collision-type access permission is repeatedly transmitted from the base station 100 in the predetermined cycle, uplink data is generated in the mobile station 200A (S20). For example, when a user of the mobile station 200A accesses the web server 20 (refer to FIG. 1) and views a web page, since a web page is downloaded from the web server 20, there is a case in which the mobile station 200A tries to transmit an http request, for example, to the web server 20.

On the basis of the collision-type access permission repeatedly transmitted in the predetermined cycle, the mobile station 200A assigns the uplink data to the collision-type access channel and transmits the uplink data to the base station 100 by using the collision-type access channel (S30 and S40). The uplink data is transferred to the web server 20 via the base station 100.

FIG. 4(*b*) illustrates a general transmission sequence of uplink data using the schedule-type access channel for comparison with the transmission sequence of the uplink data using the collision-type access channel.

As illustrated in FIG. 4(*b*), uplink data is generated in the mobile station 200A (S110). When the uplink data is generated, the mobile station 200A transmits a scheduling request for requesting the assignment of a radio resource block (RB) of an uplink radio link to the base station 100 (S120).

On the basis of the scheduling request received from the mobile station 200A, the base station 100 performs the assignment of a radio resource, that is, schedules the mobile station 200A and transmits scheduling permission (a scheduling grant) including the assigned radio resource to the mobile station 200A (S130 and S140).

On the basis of the received scheduling permission, the mobile station 200A assigns the uplink data to the schedule-type access channel and transmits the uplink data to the base station 100 by using the schedule-type access channel (S150 and S160).

Figure 5:
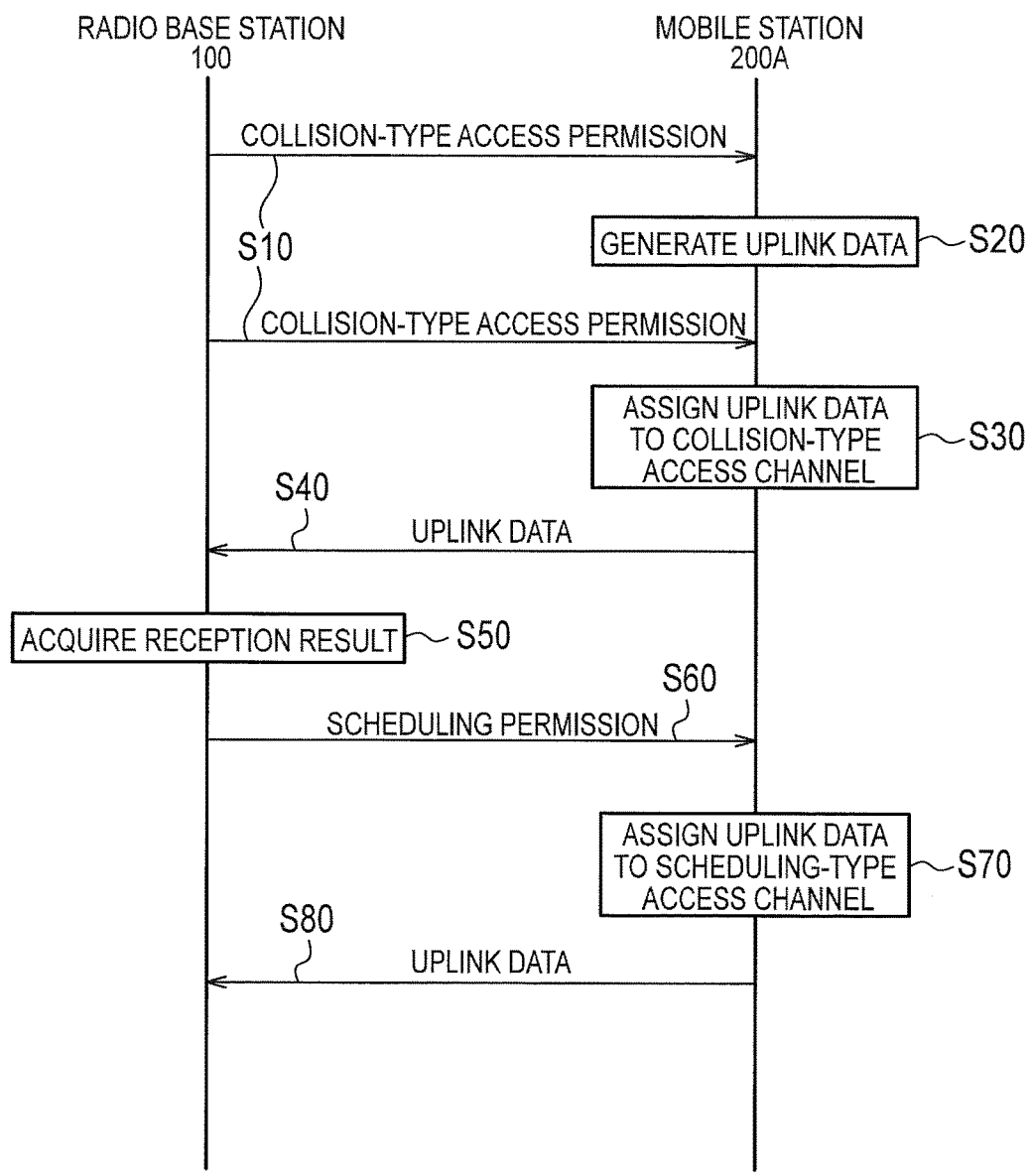
FIG. 5 is a diagram illustrating a transmission sequence of uplink data using both the collision-type access channel and the schedule-type access channel.

Furthermore, FIG. 5 illustrates a transmission sequence of uplink data using both the aforementioned collision-type access channel and schedule-type access channel. As illustrated in FIG. 5, processes from steps S10, S20, S30, and S40 are the same as those of FIG. 4(*a*).

The base station 100 acquires a reception result of the uplink data from the collision-type access channel received from the mobile station 200A. Specifically, the base station 100 acquires control information on a mobile station ID, a payload size and the like of the mobile station 200A (S50).

On the basis of the control information on a mobile station ID, a payload size and the like of the mobile station 200A, the base station 100 transmits scheduling permission (a scheduling grant) including the assignment of a radio resource in an uplink radio link to the mobile station 200A (S60).

On the basis of the received scheduling permission, the mobile station 200A assigns the uplink data to the schedule-type access channel and transmits the uplink data to the base station 100 by using the schedule-type access channel (S70 and S80). That is, the mobile station 200A seamlessly shifts from the transmission of uplink data through the collision-type access channel to the transmission of uplink data through the schedule-type access channel.

(4) Operation and Effect

According to the radio communication system 10, the base station 100 transmits collision-type access permission, which includes information on the collision-type access channel serving as a radio resource available for the transmission of uplink data by a plurality of mobile stations, toward the plurality of mobile stations. Furthermore, on the basis of the received collision-type access permission, the mobile station 200A (200B) transmits uplink data to the base station by using the collision-type access channel.

Consequently, as compared with the conventional uplink data transmission procedure in which the base station 100 transmits scheduling permission including assignment information of a radio resource to the mobile station on the basis of a scheduling request received from a designated mobile station and the mobile station transmits uplink data by using a schedule-type access channel on the basis of the received scheduling permission, it is possible to shorten a control time until the transmission of uplink data is possible. Consequently, particularly, it is possible to reduce a delay time when uplink data is small and to improve a perceived speed of a user of a mobile station.

In the present embodiment, the base station 100 acquires a mobile station ID included in the collision-type access channel and transmits scheduling permission including the assignment of a radio resource in an uplink radio link to a mobile station having the mobile station ID on the basis of the acquired mobile station ID. Consequently, the mobile station having the mobile station ID is able to seamlessly shift from the transmission of uplink data through the collision-type access channel to the transmission of uplink data through the schedule-type access channel.

In the present embodiment, according to one assignment pattern randomly selected by a predetermined method from among a plurality of assignment patterns to the collision-type access channel of uplink data, the mobile station 200A (200B) assigns the uplink data to the collision-type access channel. Consequently, even when a plurality of mobile stations (users) transmit the collision-type access channel at the same time, the base station 100 attempts to perform decoding according to the assignment pattern respectively, thereby decoding uplink data simultaneously transmitted from the plurality of mobile stations.

In the present embodiment, when radio resource blocks assigned as the collision-type access channel are discontinuous in at least one of a frequency domain and a time domain, the mobile station 200A (200B) transmits uplink data according to the orthogonal frequency division multiplexing (OFDM) scheme. Consequently, even when the radio resource blocks are discontinuous, it is possible to efficiently use the radio resource blocks as the collision-type access channel.

(5) Other Embodiments

Thus, the content of the present invention is disclosed through an embodiment according to the present invention. However, it should not be interpreted that the statements and drawings constituting a part of the present disclosure limit the present invention. From this disclosure, a variety of alternate embodiments will be apparent to one skilled in the art.

For example, the aforementioned embodiment is described based on the schedule-type access in the LTE. However, an application range of the present invention is not limited to the LTE, and the present invention is extensively applicable to a radio communication system in which scheduling permission including the assignment of a base station radio resource is transmitted to a mobile station on the basis of a scheduling request received from one or a plurality of mobile stations.

Moreover, the collision-type access channel may be applied to a small base station of a femto cell, for example, and the schedule-type access channel may be applied to a public base station of a macro cell, for example. Alternatively, on the basis of the service quality (QoS) of uplink data, it may be possible to determine whether to use the collision-type access channel. For example, the collision-type access channel may be used for the transmission of uplink data related to an application of VoIP, a game and the like that are sensitive to delay.

Furthermore, the base station 100 and the mobile stations 200A and 200B may notify each other of whether to cope with collision-type access.

As described above, needless to say, the present invention includes various embodiments and the like not described here. Therefore, the technical range of the present invention is to be defined only by the inventive specific matter according to the adequate claims from the above description.

In addition, the entire content of Japanese Patent Application No. 2011-133065 (filed on Jun. 15, 2011) is incorporated in the present specification by reference.

INDUSTRIAL APPLICABILITY

According to the characteristics of the present invention, it is possible to shorten a control time until the transmission of uplink data is possible, and to improve a perceived speed of a user when uplink data is small.

REFERENCE SIGNS LIST

10 . . . Radio communication system
20 . . . Web server
30 . . . Core network
100 . . . Base station
105 . . . Scheduler
110 . . . Scheduling permission transmission unit
120 . . . ACK signal transmission unit
130 . . . Collision-type access permission transmission unit
140 . . . Collision-type access channel reception unit
150 . . . Schedule-type access channel reception unit
200A, 200B . . . Mobile station
210 . . . Schedule-type access channel transmission unit
220 . . . Collision-type access channel transmission unit
230 . . . Collision-type access permission reception unit
240 . . . ACK signal reception unit

The invention claimed is:
1. A radio communication system, comprising:
a mobile station that transmits a scheduling request for requesting assignment of a radio resource by a resource block unit in an uplink radio link; and
a base station that transmits scheduling permission including the assignment of the radio resource by the resource block unit to the mobile station on the basis of the scheduling request received from one or a plurality of mobile stations,
wherein the base station comprises:
an access permission transmitter that transmits toward a plurality of mobile stations collision-type access permission including a combination of: information on assignment of a radio resource by the resource block unit in a collision-type access; an access ID that identifies the collision-type access permission and that is configured by a data sequence used for error detection; and a signal format used in the collision-type access, wherein one or more resource blocks of the radio resource in the collision-type access are available for transmission of uplink data by the plurality of mobile stations without depending on the scheduling request, and
the mobile station comprises:
an access permission receiver that receives the collision-type access permission from the base station; and
a data transmitter that transmits the uplink data to the base station by using the one or more resource blocks on the basis of the received collision-type access permission,
wherein the data transmitter assigns the uplink data to the one or more resource blocks according to one spreading code randomly selected by a predetermined method from among a plurality of spreading codes to resource elements included in each resource block notified by the collision-type access permission.

2. A base station, which receives a scheduling request for requesting assignment of a radio resource by a resource block unit in an uplink radio link from one or a plurality of mobile stations and transmits scheduling permission including the assignment of the radio resource by the resource block unit to the mobile station on the basis of the received scheduling request, comprising:
an access permission transmitter that transmits toward a plurality of mobile stations collision-type access permission including a combination of: information on assignment of a radio resource by the resource block unit in a collision-type access; an access ID that identifies the collision-type access permission and that is configured by a data sequence used for error detection; and a signal format used in the collision-type access, wherein one or more resource blocks of the radio resource in the collision-type access are available for transmission of uplink data by the plurality of mobile stations without depending on the scheduling request,
wherein each mobile station assigns the uplink data to the one or more resource blocks according to one spreading code randomly selected by a predetermined method from among a plurality of spreading codes to resource elements included in each resource block notified by the collision-type access permission.

3. A mobile station, which transmits a scheduling request for requesting assignment of a radio resource by a resource block unit in an uplink radio link toward a base station and receives scheduling permission transmitted on the basis of the scheduling request and including the assignment of the radio resource by the resource block unit from the base station, comprising:
an access permission receiver that receives from the base station collision-type access permission including a combination of: information on assignment of a radio resource by the resource block unit in a collision-type access; an access ID that identifies the collision-type access permission and that is configured by a data sequence used for error detection; and a signal format used in the collision-type access, wherein one or more resource blocks of the radio resource in the collision-type access are available for transmission of uplink data by a plurality of mobile stations without depending on the transmission of the scheduling request, and
a data transmitter that transmits the uplink data to the base station by using the one or more resource blocks on the basis of the received collision-type access permission,
wherein the data transmitter assigns the uplink data to the one or more resource blocks according to one spreading code randomly selected by a predetermined method from among a plurality of spreading codes to resource elements included in each resource block notified by the collision-type access permission.

4. A radio communication method which uses:
a mobile station that transmits a scheduling request for requesting assignment of a radio resource by a resource block unit in an uplink radio link; and
a base station that transmits scheduling permission including the assignment of the radio resource by the resource block unit to the mobile station on the basis of the scheduling request received from one or a plurality of mobile stations, wherein the radio communication method comprises:
a step of transmitting, by the base station, toward a plurality of mobile stations, collision-type access permission including a combination of: information on assignment of a radio resource by the resource block unit in a collision-type access; an access ID that identifies the collision-type access permission and that is configured by a data sequence used for error detection; and a signal format used in the collision-type access, wherein one or more resource blocks of the radio resource in the collision-type access are available for transmission of uplink data by the plurality of mobile stations without depending on the scheduling request;
a step of receiving, by the mobile station, the collision-type access permission from the base station;
a step of assigning, by the mobile station, the uplink data to the one or more resource blocks according to one spreading code randomly selected by a predetermined method from among a plurality of spreading codes to resource elements included in each resource block notified by the collision-type access permission; and
a step of transmitting, by the mobile station, the assigned uplink data to the base station by using the one or more resource blocks.

* * * * *